(12) United States Patent
Ruggiero et al.

(10) Patent No.: US 9,612,901 B2
(45) Date of Patent: Apr. 4, 2017

(54) MEMORIES UTILIZING HYBRID ERROR CORRECTING CODE TECHNIQUES

(71) Applicant: Intel Corporation, Santa Clara, CA (US)

(72) Inventors: Joshua D. Ruggiero, Chandler, AZ (US); James A. Coleman, Mesa, AZ (US); Gary J. Lavelle, Newtown, PA (US)

(73) Assignee: Intel Corporation, Santa Clara, CA (US)

( * ) Notice: Subject to any disclaimer, the term of this patent is extended or adjusted under 35 U.S.C. 154(b) by 50 days.

(21) Appl. No.: 13/725,298

(22) Filed: Dec. 21, 2012

(65) Prior Publication Data

US 2013/0262958 A1  Oct. 3, 2013

(51) Int. Cl.
  *H03M 13/00* (2006.01)
  *G06F 11/10* (2006.01)

(52) U.S. Cl.
  CPC .......... *G06F 11/10* (2013.01); *G06F 11/1048* (2013.01)

(58) Field of Classification Search
  CPC .. G06F 11/10; G06F 11/1048; G06F 11/1052; G06F 11/004
  See application file for complete search history.

(56) References Cited

U.S. PATENT DOCUMENTS

| | | | |
|---|---|---|---|
| 7,117,421 B1 | 10/2006 | Danilak | |
| 7,461,320 B2 | 12/2008 | Klein | |
| 7,904,786 B2 | 3/2011 | Hilton et al. | |
| 8,738,995 B2* | 5/2014 | Emerson et al. | 714/768 |
| 2006/0123320 A1* | 6/2006 | Vogt | 714/762 |
| 2007/0014292 A1 | 1/2007 | Obata | |
| 2007/0220354 A1* | 9/2007 | Moyer | 714/42 |
| 2008/0235485 A1 | 9/2008 | Haertel et al. | |
| 2012/0124448 A1* | 5/2012 | Emerson et al. | 714/758 |
| 2012/0144264 A1* | 6/2012 | Bains | 714/758 |
| 2013/0007574 A1 | 1/2013 | Langadi et al. | |
| 2013/0262958 A1 | 10/2013 | Ruggiero et al. | |
| 2014/0157043 A1* | 6/2014 | Ruggiero | 714/6.2 |

FOREIGN PATENT DOCUMENTS

KR  100866970  11/2008

OTHER PUBLICATIONS

International Search Report and Written Opinion for PCT/US2012/031683 mailed Nov. 30, 2012, 9 pages.

(Continued)

*Primary Examiner* — Guerrier Merant
(74) *Attorney, Agent, or Firm* — Blakely, Sokoloff, Taylor & Zafman LLP

(57) ABSTRACT

Use of hybrid error correcting code (ECC) techniques. A memory access request having an associated address is received. A memory controller determines whether the address corresponds to a first region of a memory for which ECC techniques are applied or a second region of the memory for which ECC techniques are not applied. The memory access is processed utilizing ECC techniques if the address corresponds to the first region of the memory, a transaction indicator and an execution unit indicator, and processed without utilizing the ECC techniques if the address corresponds to the second region of the memory.

28 Claims, 6 Drawing Sheets

MEMORY MAP WITH HYBRID-ECC

(56) References Cited

OTHER PUBLICATIONS

International Preliminary Report on Patentability for PCT/US2012/031683 mailed Oct. 9, 2014, 6 pages.
Non-Final Office Action for U.S. Appl. No. 13/997,713 mailed Nov. 5, 2014, 8 pages.
Final Office Action for U.S. Appl. No. 13/997,713, mailed Mar. 27, 2015, 11 pages.

* cited by examiner

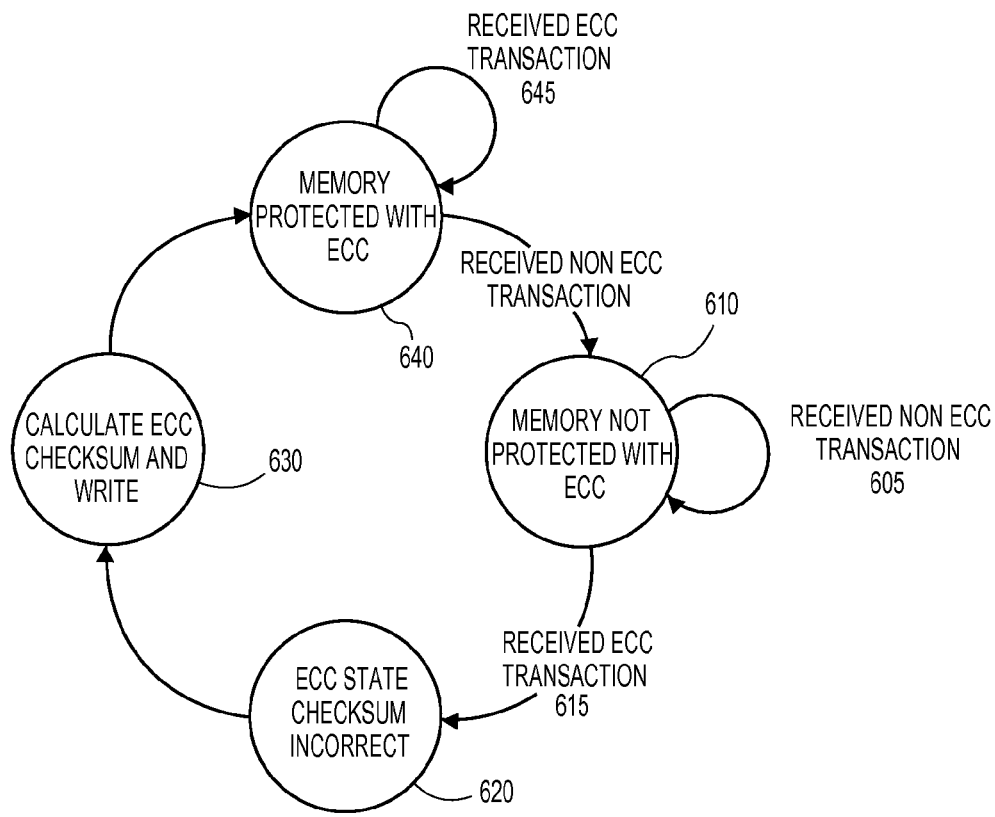

On Any NON ECC Transaction:

| Read | Full Write | Partial Write |
|---|---|---|
| Read Data Ignore ECC | Write Data | Write Data |

On Non-ECC to ECC Transition:

| Read | Full Write | Partial Write |
|---|---|---|
| Read Data Compute ECC Write ECC | Compute ECC Write Data Write ECC | Read Data Merge with Partial Writes Compute ECC Write Data Write ECC |

ECC Transaction when in ECC Protection State (standard ECC operation):

| Read | Full Write | Partial Write |
|---|---|---|
| Read Data Check ECC | Compute ECC Write Data Write ECC | Read Data Merge with Partial Data Compute ECC Write Data Write ECC |

FIG. 6

MEMORIES UTILIZING HYBRID ERROR CORRECTING CODE TECHNIQUES

This application is a continuation-in-part of International Patent Application No. PCT/US2012/031683, filed Mar. 30, 2012, which is currently pending, and claims priority to and is incorporated herewith.

TECHNICAL FIELD

Embodiments of the invention relate to memory systems. More particularly, embodiments of the invention relate to utilization of hybrid error correcting code techniques to provide more efficient memories.

BACKGROUND

Error correcting code (ECC) techniques are utilized to detect and/or correct errors in memory, and may be used, for example, in mission-critical applications. Memory errors with ECC do not cause a system failure, but allow a system to detect and correct the error and continue operating. Use of ECC techniques is expanding and is desirable in other applications as well. However, ECC overhead may excessive for some applications where ECC is desirable.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 6 is a state diagram for one embodiment of a technique to manage a memory system having ECC protected regions, hybrid ECC regions and non-ECC protected regions.

DETAILED DESCRIPTION

Figure 1:
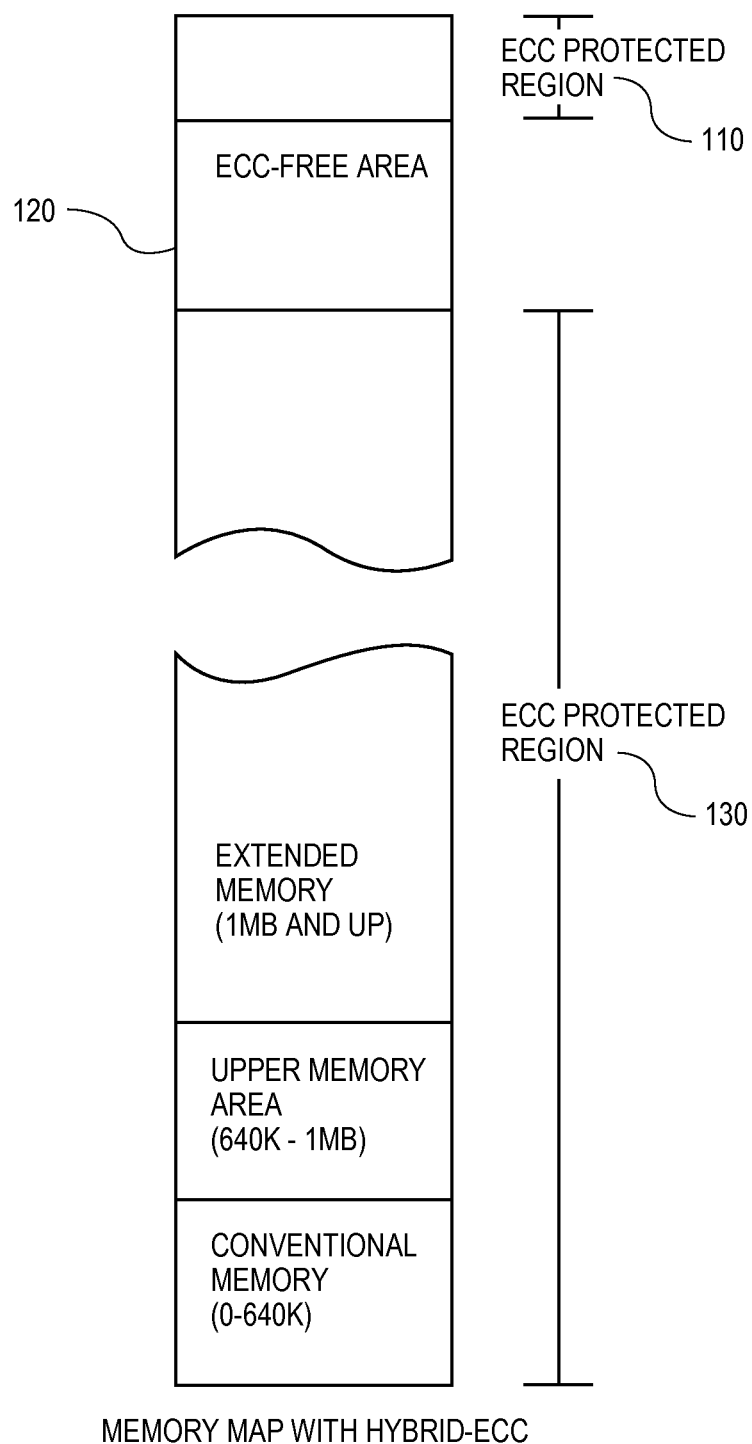
FIG. 1 is a conceptual illustration of an example memory map including both ECC protected regions and non-ECC protected regions.

In the following description, numerous specific details are set forth. However, embodiments of the invention may be practiced without these specific details. In other instances, well-known circuits, structures and techniques have not been shown in detail in order not to obscure the understanding of this description.

Partial write memory throughput performance as part of ECC protection can experience up to a 70% degradation due to a Read/Modify/Write process for the checksum calculation required by ECC techniques. This performance degradation in partial writes can be a severe problem, for example, for integrated graphics performance because integrated graphics frequently update the frame buffer stored in system memory with numerous partial writes. Thus, applying ECC to integrated graphics results in performance degradation that may outweigh the benefits of ECC protection. This may be applicable to other situations as well.

Techniques described herein provide a "non-ECC" window or area in a memory map. This is an area in the memory map where ECC operations (e.g., Read/Modify/Write, compute checksum) do not apply. In one embodiment, this area is specified by a starting address and size or range; however, other techniques for specifying the non-ECC window can also be utilized. In another embodiment, ECC vs. non-ECC may be specified on a per transaction basis.

Returning to the integrated graphics example, the area of system memory reserved for integrated graphics would be assigned to a non-ECC window. The same may also apply to video encode and video decode blocks that also share system memory normally protected by ECC. These regions for integrated graphics as well as video encode and decode do not require the protection that ECC affords because, if a pixel has an error and appears as the wrong color, it will be on the screen for ¼ or ⅙₀ of a second, for example, depending on the refresh rate. This may not be noticeable to a user.

Various embodiments of the techniques described herein utilize one or more registers (or other storage mechanisms) to define one or more non-ECC windows in a memory protected by ECC techniques, as well as logic that checks incoming addresses for reads and writes in the memory controller against the window. For addresses that fall within the non-ECC window, the partial writes will not incur the read-merge-checksum-compute-write penalty, but rather be written directly with the checksum value being a "don't care." For reads, the checksum may be ignored and checksum errors suppressed.

Currently, a system designer must choose between higher-level graphics performance protection and ECC protection. Some systems address this problem by adding a shared cache to a graphics core. This causes the memory controller to see a full cache line instead of a partial cache line, thus not needing the Read/Modify/Write operation. This is a costly addition to a graphics core that is not applicable, for example, to embedded systems, where power and cost must be kept as low as possible.

General-purpose graphics processing unit (GPU) programming models generally provide limited control over the memory regions used by the executable units (EUs). This lack of control inhibits a programmer's ability to specify the memory type range register (MTRR) properties of the memory used. Some DSP-like functions can be offloaded to a GPU, for example a Gaussian Blur to modify a single pixel at a time, which results in a significant number of partial write operations.

Some of these DSP functions for image processing (e.g., Gaussian Blur) or analog signal processing may operate on data having errors. As a result, ECC protection on the data may provide no benefit. However, some DSP functions, such as digital signal processing, require ECC protection (e.g., CRAN flows after CRC in a digital packet). In some embodiments, a GPU can handle both workloads simultaneously, requiring the GPU memory region to be set to ECC and forcing the analog portion of the flow to incur a significant performance penalty due to partial writes in an ECC protected area.

The GPU programming model does not allow the programmer to specify the ECC free region. In various embodiments, the following components can be utilized to provide ECC protection on a per transaction basis. In one embodiment, a bit, a flag, or other indicator is included in the transaction to specify a non-ECC transaction. In one embodiment, a bit, a flag or other indicator is provided in a control register of the EU to specify that a transaction is not precise (i.e., non-ECC). In one embodiment, tracking mechanisms are provided per cache line that are utilized to determine if the region is ECC protected or non-ECC. In one embodiment, logic (e.g., hardware, software, firmware, combination thereof) is provided to manage the ECC status of each cache line based on the current status bit and the transaction bit.

FIG. 1 is a conceptual illustration of an example memory map including both ECC protected regions and non-ECC protected regions. The example of FIG. 1 illustrates only one ECC-free region; however, any number of ECC-free regions can be supported in a similar manner. The example of FIG. 1 illustrates the ECC-free region near the "top" of the memory region; however, the ECC-free region(s) can be placed in other locations as well.

In the example of FIG. 1, ECC-Protected region 130 includes conventional memory space (e.g., 0 to 640 kb), upper memory space (e.g., 640 kb to 1 Mb) and a portion of extended memory space (e.g., 1 Mb and higher). In one embodiment, ECC-free region 120 is within the extended memory space. In one embodiment, there is also ECC-protected region 110 above ECC-free area 120. In alternate embodiments, multiple ECC-free areas may be created within the extended memory space.

Figure 2:
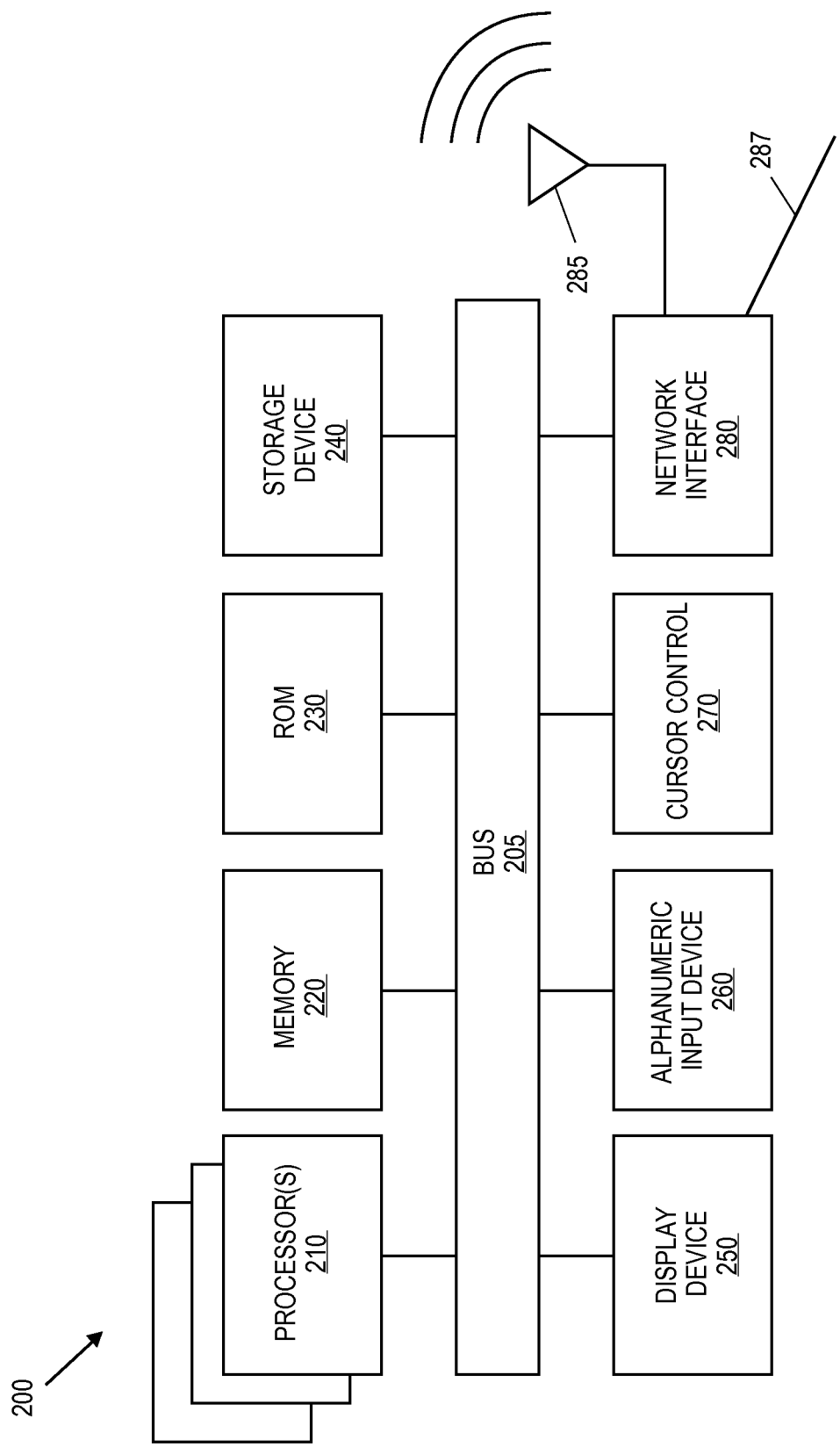
FIG. 2 is a block diagram of one embodiment of an electronic system.

FIG. 2 is a block diagram of one embodiment of an electronic system. The electronic system illustrated in FIG. 2 is intended to represent a range of electronic systems (either wired or wireless) including, for example, desktop computer systems, laptop computer systems, cellular telephones, personal digital assistants (PDAs) including cellular-enabled PDAs, set top boxes. Alternative electronic systems may include more, fewer and/or different components. The electronic system of FIG. 2 may represent any of the electronic systems of FIG. 1.

Electronic system 200 includes bus 205 or other communication device to communicate information, and processor 210 coupled to bus 205 that may process information. While electronic system 200 is illustrated with a single processor, electronic system 200 may include multiple processors and/or co-processors. Electronic system 200 further may include random access memory (RAM) or other dynamic storage device 220 (referred to as main memory), coupled to bus 205 and may store information and instructions that may be executed by processor 210. Memory 220 may also be used to store temporary variables or other intermediate information during execution of instructions by processor 210. In one embodiment, memory 220 may be a memory system organized as described above with respect to FIG. 1.

Electronic system 200 may also include read only memory (ROM) and/or other static storage device 230 coupled to bus 205 that may store static information and instructions for processor 210. Data storage device 240 may be coupled to bus 205 to store information and instructions. Data storage device 240 such as a magnetic disk or optical disc and corresponding drive may be coupled to electronic system 200.

Electronic system 200 may also be coupled via bus 205 to display device 250, such as a cathode ray tube (CRT) or liquid crystal display (LCD), to display information to a user. Alphanumeric input device 260, including alphanumeric and other keys, may be coupled to bus 205 to communicate information and command selections to processor 210. Another type of user input device is cursor control 270, such as a mouse, a trackball, or cursor direction keys to communicate direction information and command selections to processor 210 and to control cursor movement on display 250.

Electronic system 200 further may include network interface(s) 280 to provide access to a network, such as a local area network. Network interface(s) 280 may include, for example, a wireless network interface having antenna 285, which may represent one or more antenna(e). Network interface(s) 280 may also include, for example, a wired network interface to communicate with remote devices via network cable 287, which may be, for example, an Ethernet cable, a coaxial cable, a fiber optic cable, a serial cable, or a parallel cable.

In one embodiment, network interface(s) 280 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 280 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 3:
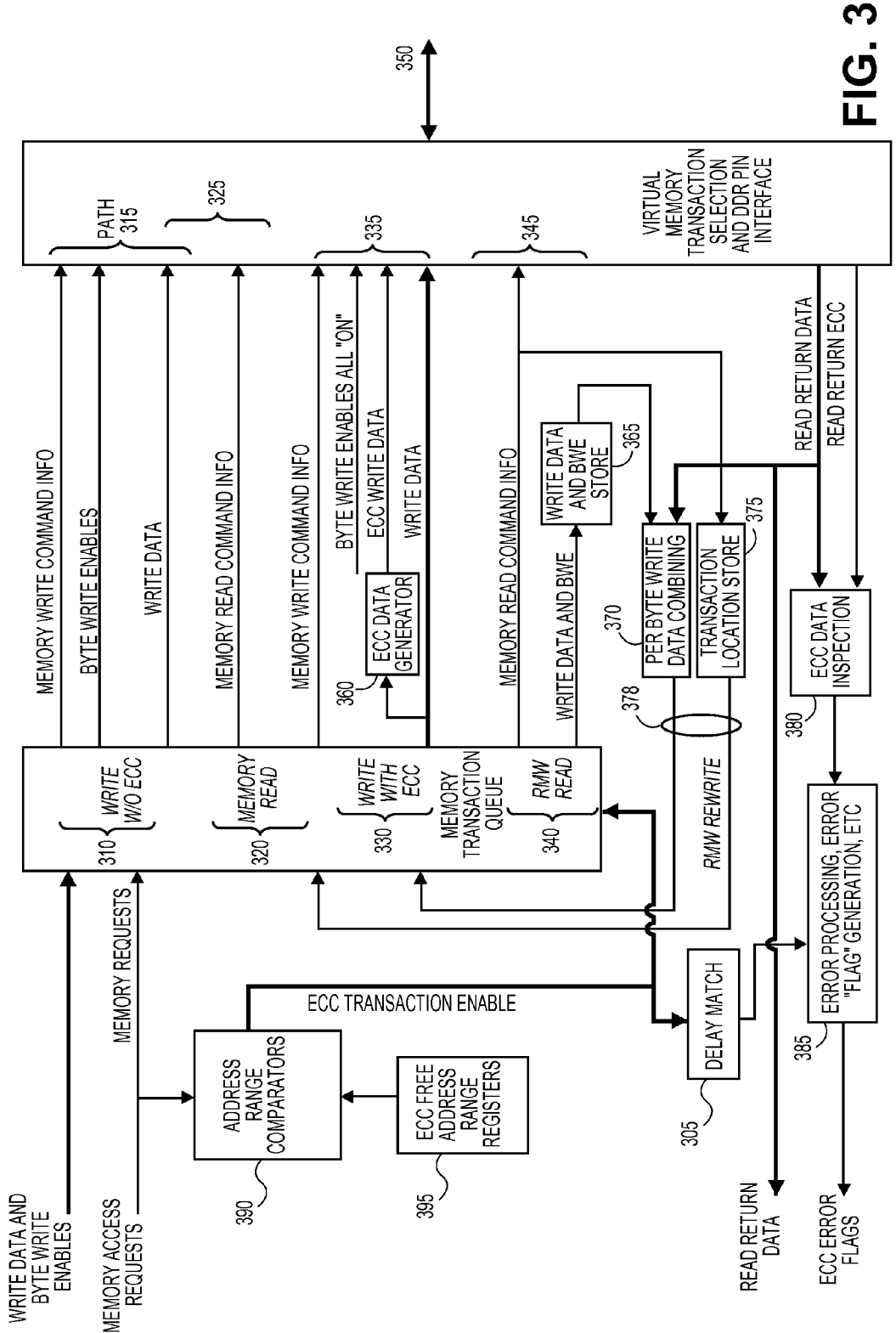
FIG. 3 is a block diagram of one embodiment of a memory subsystem with selectable ECC processing.

FIG. 3 is a block diagram of one embodiment of a memory subsystem with selectable ECC processing. In one embodiment, the memory subsystem supports four main types of memory transactions: 1) writes with ECC disabled, 2) reads with or without ECC enabled, 3) writes with ECC enabled, and 4) prefetch reads associated with read/write/modify (RMW) cycles needed for partial writes with ECC.

When ECC is enabled, for example, through software selection, all writes (at least al partial writes) are completed via two memory accesses: a read of the memory location to prefetch the data already present (via path 340-345), an internal merging of the read data with the new write data on a byte-by-byte basis (via path 378), and a rewrite of the memory location including new ECC values (via path 330-335).

In one embodiment, path 310-315 includes mechanisms (e.g., bus lines) to transmit memory write command information, byte write enable signals, and the data to be written from a memory transaction queue to a memory interface (e.g., DDR-3, DDR-4). In one embodiment, path 320-325 includes mechanisms (e.g., bus lines) to transmit memory read command information from the memory transaction queue to the memory interface.

In one embodiment, path 330-335 includes mechanisms (e.g., bus lines) to transmit memory write command information, byte write enable signals, ECC write data as generated by ECC data generator 360 and data to be written. Path 340-345 includes mechanisms (e.g., bus lines) to transmit memory read command information to the memory interface. The memory read command information is also transmitted to transaction location store 375 that utilizes the memory read command information for RMW rewrite operations on path 378.

In one embodiment, the memory transaction queue provides write data and BWE to write data and BWE store 365, which stores the data and forwards it to transaction location store 375 that utilizes it for RMW rewrite operations on path 378. Path 378 provides the data to the memory transaction queue.

The memory subsystem of FIG. 3 is enhanced by providing a mechanism to identify system memory regions that require no ECC processing and memory regions that do require ECC processing. With this enhanced capability, ECC can be enabled or disabled for each transaction type. In the example above, software-programmable ECC-free address range registers and comparison circuitry (e.g., 390) are provided in the memory subsystem.

In one embodiment, when a particular transaction address maps to one of the ECC-free ranges, the corresponding memory transaction is performed without ECC processing. In the case of a memory read, the ECC data returning is "ignored" and ECC error processing proceeds as if no CC error is encountered (i.e., no error flags assert, no error processing is done, etc.). In the case of a write, only one memory access is required (via path 310-315), instead of needing to do a RMW (via one or more of paths 330-335, 340-345, 378).

In one embodiment, address range comparator(s) 390 compare memory access addresses sent to the memory transactions queue to one or more addresses stored in ECC-Free Address Range Registers 395 that define the boundaries of one or more ECC-free regions in memory. In response to the comparison, address range comparator(s) 390 an ECC transaction enable signal is selectively asserted to the path(s) utilized by the memory transaction queue to send data to the memory interface depending on whether ECC techniques should be applied or not.

For read operations, ECC data inspection circuitry 380 and error processing circuitry 385 operate to selectively utilize ECC data as described above. In some situations, data read form memory may be combined for rewrite operations through per byte write data combining circuitry 370.

Figure 4:
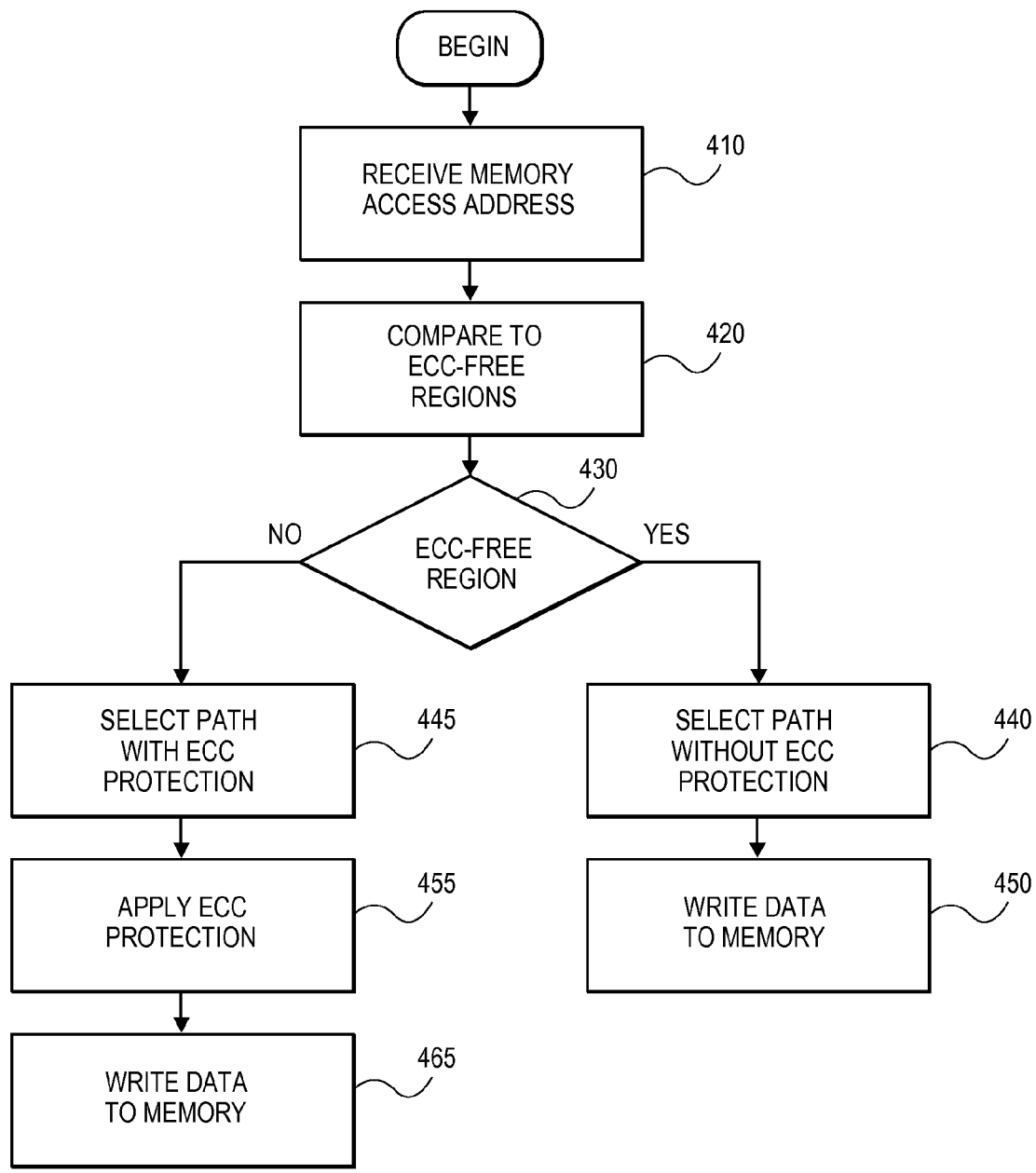
FIG. 4 is a flow diagram of a technique for selective use of ECC techniques.

FIG. 4 is a flow diagram of a technique for selective use of ECC techniques. The technique of FIG. 4 may be used to provide a memory mapping similar to the one illustrated in FIG. 1 and may be supported, for example, by using the arrangement of FIG. 3.

A memory address corresponding to a memory access is received, 410. This memory address can be received in any manner known in the art. In the example of FIG. 3, the memory address is received and compared in the memory subsystem; however, other configurations may also be supported.

The memory address is compared to one or more ECC-free regions, 420. In one embodiment, the memory subsystem includes two or more registers that are used to define the boundaries of one or more ECC-free regions; however, other configurations can also be supported. In the example of FIG. 3, the memory address is received and compared in the memory subsystem; however, other configurations may also be supported.

If the address corresponds to an ECC-free region, 430, a path through the memory subsystem that does not apply ECC protection is selected, 440. As described above with respect to FIG. 3, one or more paths through the memory subsystem may be provided that do not utilize ECC protection. In one embodiment, the comparison circuitry controls an enabling signal to determine whether ECC protection is applied or not.

The non-ECC protected data is written to memory, 450. The memory can be any type of memory, for example, DDR-3 or DDR-4 compliant memory. Other memory types can be similarly supported.

If the address does not correspond to an ECC-free region, 430, a path through the memory subsystem that does apply ECC protection is selected, 445. As described above with respect to FIG. 3, one or more paths through the memory subsystem may be provided that do utilize ECC protection. In one embodiment, the comparison circuitry controls an enabling signal to determine whether ECC protection is applied or not.

ECC protection is applied to the data, 455. Any ECC techniques known in the art can be supported. The ECC protected data is written to memory, 465. The memory can be any type of memory, for example, DDR-3 or DDR-4 compliant memory. Other memory types can be similarly supported.

This has the effect of making more efficient use of existing memory bandwidth, reducing average latency for each memory transaction, and increasing the total memory bandwidth available for each application. Identification of the ECC-free regions can be done by mechanisms other than address range mapping. For example, particular application streams (e.g., video or graphics pixel updates) might be tagged in such a way that the memory subsystem chooses the ECC-free path for transactions originating from these application sources.

Figure 5:
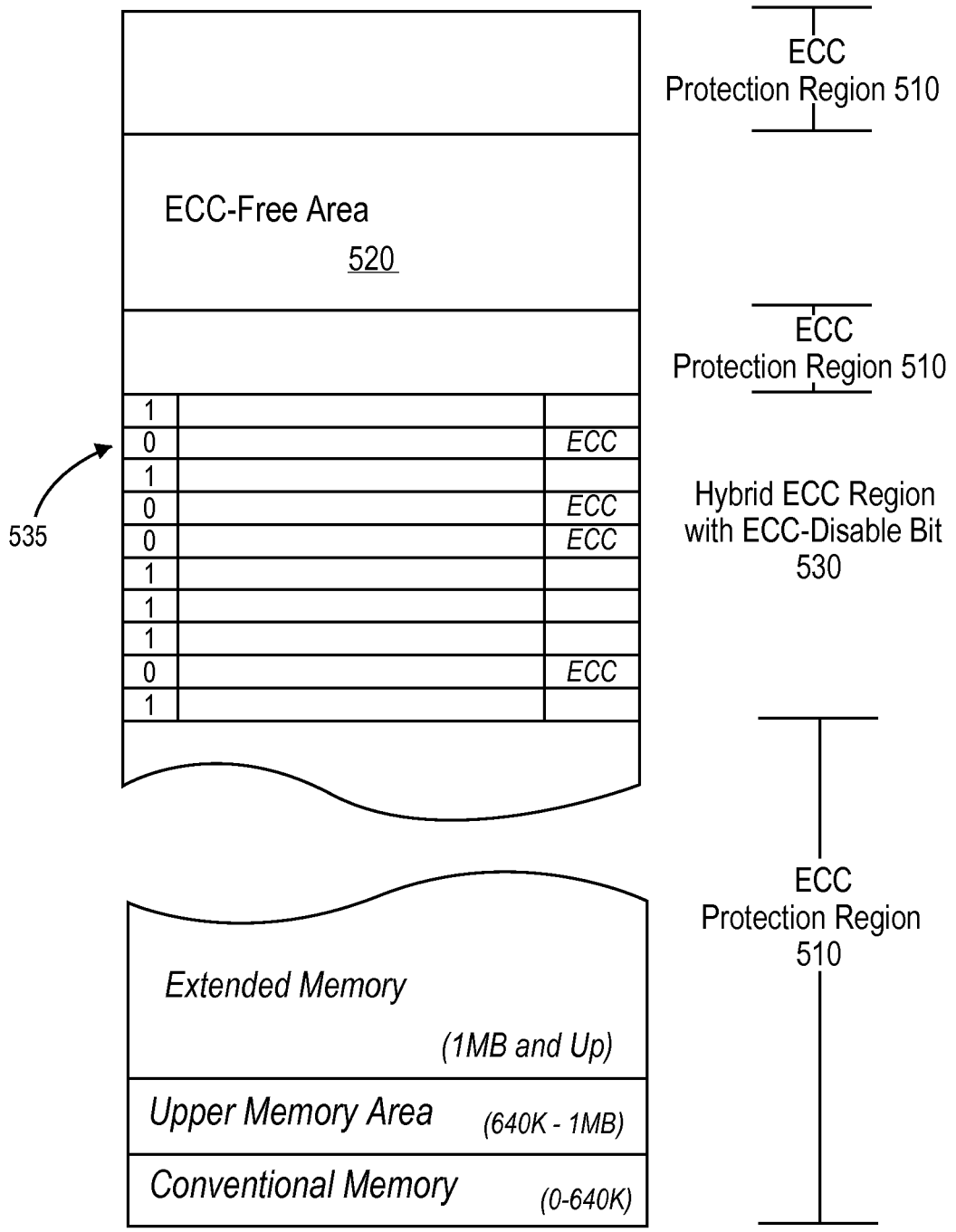
FIG. 5 is a conceptual illustration of an example memory map including ECC protected regions, hybrid ECC regions and non-ECC protected regions.

FIG. 5 is a conceptual illustration of an example memory map including ECC protected regions, hybrid ECC regions and non-ECC protected regions. The example of FIG. 5 illustrates only one ECC-free region and one hybrid ECC region; however, any number of ECC-free regions and any number of hybrid ECC regions can be supported in a similar manner The example of FIG. 5 illustrates the ECC-free region near the "top" of the memory region; however, the ECC-free region(s) can be placed in other locations as well.

In the example of FIG. 5, ECC-Protected region 510 includes conventional memory space (e.g., 0 to 640 kb), upper memory space (e.g., 640 kb to 1 Mb) and a portion of extended memory space (e.g., 1 Mb and higher). In one embodiment, ECC-free region 520 is within the extended memory space. In one embodiment, there is also ECC-protected region 510 above ECC-free area 520. In alternate embodiments, multiple ECC-free areas may be created within the extended memory space.

Hybrid ECC region 530 provides ECC protection as described above with the ability to control use of ECC protection on a per-transaction basis. Thus, hybrid ECC region 530 is not necessarily completely protected by ECC techniques. In one embodiment, portions of hybrid memory region 530 have a corresponding indicator (e.g., flag, bit) 535 that indicates whether the data is ECC protected. As described in greater detail below, in one embodiment, a bit, a flag, or other indicator is included in the transaction to specify a non-ECC transaction.

In one embodiment, a bit, a flag or other indicator is provided in a control register of the EU to specify that a transaction is not precise (i.e., non-ECC). In one embodiment, tracking mechanisms are provided per cache line that are utilized to determine if the region is ECC protected or non-ECC. In one embodiment, logic (e.g., hardware, software, firmware, combination thereof) is provided to manage the ECC status of each cache line based on the current status bit and the transaction bit.

FIG. 6 is a state diagram for one embodiment of a technique to manage a memory system having ECC protected regions, hybrid ECC regions and non-ECC protected regions. For transactions received that are designated as non-ECC transactions, 605, the transactions are completed to non-ECC memory regions, 610. Read data is read from the address in the transaction, and both full and partial writes are written to the address in the transaction. Any ECC data associated with data stored in memory is ignored by the read transaction.

If the received transaction is an ECC-protected transaction, 615, directed to memory not protected with ECC, 610, the ECC state checksum will be incorrect, 620. For a non-ECC to ECC transition read operation, the data is read, the ECC is computed and the ECC value is written to memory, 630. For a non-ECC to ECC transition full write operation, the ECC is computed, the data is written to memory, and the ECC value is written to memory, 630. For a non-ECC to ECC transition partial write operation, the data is read and merged with partial writes, the ECC is computed, the data is written to memory, and the ECC value is written to memory, 630.

If an ECC transaction is received, 645, and directed to memory protected by ECC, 640, the transaction is treated as a standard ECC operation. For a read operation, the data is read and the ECC value is checked. For full write operations, the ECC checksum is computed, the data is written to memory and the ECC checksum is written to memory. For a partial write operation, the data is read and merged with partial writes, the ECC is computed, the data is written to memory, and the ECC value is written to memory. The result is memory protected with ECC, 640.

Use of hybrid error correcting code (ECC) techniques. A memory access request having an associated address is received. A memory controller determines whether the address corresponds to a first region of a memory for which ECC techniques are applied or a second region of the memory for which ECC techniques are not applied. The memory access is processed utilizing ECC techniques if the address corresponds to the first region of the memory and processed without utilizing the ECC techniques if the address corresponds to the second region of the memory and the memory control device to selectively apply the ECC technique based on a transaction indicator and an execution unit indicator.

The memory access request can be a read request. The memory access request comprises a write request. The second portion of the memory addresses can be configurable. The second portion of the memory addresses can be utilized to store graphics data. The second portion of the memory addresses may reside in an expended memory region. The memory devices can be dynamic random access memory (DRAM) devices. The memory control device manages the ECC technique of each cache line based on a status indicator and the transaction indicator.

A system may be utilized, the system can include memory devices to provide data storage corresponding to a range of memory addresses. A first portion of the memory addresses are protected by an error correcting code (ECC) technique and a second portion of the memory addresses are not protected by the ECC technique. A memory control device can be coupled with the memory devices. The memory control device can have a plurality of processing paths. A first set of the processing paths apply the ECC technique to data and a second set of the processing paths cause the data to be stored without applying the ECC technique. The memory control device selectively applies the ECC technique based on an address corresponding to a memory access request and the memory control device to selectively apply the ECC technique based on a transaction indicator and an execution unit indicator.

The memory access request can be a read request. The memory access request comprises a write request. The second portion of the memory addresses can be configurable. The second portion of the memory addresses can be utilized to store graphics data. The second portion of the memory addresses may reside in an expended memory region. The memory devices can be dynamic random access memory (DRAM) devices. The memory control device manages the ECC technique of each cache line based on a status indicator and the transaction indicator.

A memory control circuit can include a first interface to communicate with processing circuitry and a second interface to communicate with memory devices and control circuitry coupled with the first interface and the second interface. The control circuitry receives a memory access request having an associated address via the first interface, determines whether the address corresponds to a first region of a memory for which error correcting code (ECC) techniques are applied or a second region of the memory for which ECC techniques are not applied, processes the memory access utilizing ECC techniques if the address corresponds to the first region of the memory, and processes the memory access without utilizing the ECC techniques if the address corresponds to the second region of the memory and the memory control device to selectively apply the ECC technique based on a transaction indicator and an execution unit indicator.

The memory access request can be a read request. The memory access request comprises a write request. The second portion of the memory addresses can be configurable. The second portion of the memory addresses can be utilized to store graphics data. The second portion of the memory addresses may reside in an expended memory region. The memory devices can be dynamic random access memory (DRAM) devices. The memory control device manages the ECC technique of each cache line based on a status indicator and the transaction indicator.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system comprising:
   a system memory comprising memory devices to provide data storage corresponding to a range of memory addresses, a first portion of the memory addresses to be protected by an error correcting code (ECC) technique and a second portion of the memory addresses to not be protected by the ECC technique;

a memory control device coupled with the system memory, the memory control device comprising a plurality of processing paths, wherein a first set of the processing paths operate to apply the ECC technique to data before storage of the data and a second set of the processing paths operate to cause the data to be stored without application of the ECC technique, the memory control device to selectively apply the ECC technique based on a per-transaction indicator of ECC/no-ECC protection so that ECC protection/no-ECC protection is implemented at per-cache line granularity and wherein an ECC protected transaction is able to target a cache line that is not ECC protected, the memory controller comprising logic to, in response to the ECC protected transaction targeting the cache line that is not ECC protected and irrespective of whether the ECC protected transaction is a read transaction or a write transaction, calculate an ECC value for the cache line and write the cache line with the ECC value into the system memory.

2. The system of claim 1 wherein the memory control device is to manage the ECC technique of each cache line based on a status indicator and the per-transaction indicator.

3. The system of claim 1 wherein the memory control device is to track cache lines to determine which cache lines are protected by the ECC technique.

4. The system of claim 1 wherein the second portion of the memory addresses resides in an expended memory region.

5. The system of claim 1 wherein the memory devices comprise dynamic random access memory (DRAM) devices.

6. The system of claim 5 wherein the DRAM devices comply with a double data rate (DDR) standard.

7. A method comprising:
receiving a memory access request having an associated address;
determining that the memory access request is an ECC protected transaction;
determining that the memory access request targets a cache line without ECC protection; and,
irrespective of whether the memory access request is a read request or a write request, as part of processing the memory access request, calculating an ECC value for the cache line and writing the cache line with the ECC value into memory.

8. The method of claim 7 wherein the memory access request is a read request.

9. The method of claim 7 wherein the memory access request is a write request.

10. The method of claim 7 further comprising allocating a first region of memory as ECC protected and allocating a second region of memory as non ECC protected.

11. The method of claim 7 wherein the memory access request includes information that identifies it as an ECC protected transaction.

12. The method of claim 7 further comprising:
receiving a second memory access request having a second associated address, the second memory access request being a write request that targets an address having an ECC protected cache line;
determining that the second memory access request is a non ECC protected transaction;
satisfying the second memory access request by writing a second cache line to the second associated address without ECC protection.

13. An apparatus comprising:
a first interface to communicate with processing circuitry;
a second interface to communicate with memory comprising memory devices;
control circuitry coupled with the first interface and the second interface, the control circuitry to receive a memory access read request via the first interface that targets a cache line characterized as having ECC protection or no ECC protection, the memory access read request characterized as having ECC protection or no ECC protection by information contained in the memory access read request, the control circuitry to calculate and write into the memory an ECC value for the cache line in response to the cache line being characterized as having no ECC protection and the memory access read request being characterized as having ECC protection.

14. The apparatus of claim 13, the control circuitry is to track cache lines on an ECC protection/no-ECC protection basis.

15. The apparatus of claim 13 wherein the control circuitry contains register space to identify a region of the memory that is not ECC protected.

16. The apparatus of claim 15 wherein the region of the memory is to store graphics data.

17. The apparatus of claim 13 wherein the memory devices comprise dynamic random access memory (DRAM) devices.

18. The apparatus of claim 17 wherein the DRAM devices comprise dual data rate standard compliant devices.

19. An apparatus, comprising:
a memory controller to receive a memory access transaction characterized as having ECC protection or no ECC protection, said memory access transaction to target a cache line characterized as having ECC protection or no ECC protection, said memory controller having logic to calculate and write an ECC value into memory for a cache line characterized as having no ECC protection and targeted by a memory access transaction characterized as having ECC protection.

20. The apparatus of claim 19 wherein the memory access transaction characterized as having ECC protection is further characterized as a read transaction.

21. The apparatus of claim 19 wherein the memory access transaction characterized as having ECC protection is further characterized as a write transaction.

22. The apparatus of claim 19 wherein the memory access transaction characterized as having ECC protection is identified as having ECC protection based on information within the memory access transaction.

23. The apparatus of claim 19 wherein the memory access transaction characterized as having ECC protection is identified as having ECC protection based on an execution unit indicator.

24. The apparatus of claim 19 wherein the logic is further to perform any of a) and b) below:
a) not calculate an ECC value and not write into memory an ECC value for a non ECC protected cache line targeted by a non ECC protected memory access request;
b) calculate and write into memory an ECC value for an ECC protected cache line targeted by an ECC protected memory access request.

25. The apparatus of claim 24 wherein the logic is to perform both a) and b) above.

26. The apparatus of claim 19 wherein the memory controller includes register space to identify at least a) below:
   a) a first ECC protected memory address range;
   b) a second ECC protected memory address range.

27. The apparatus of claim 26 wherein the memory controller register space is to identify both a) and b) above.

28. The apparatus of claim 19 wherein the memory is coupled to the memory controller.

* * * * *